US012277792B2

(12) United States Patent
Kumar et al.

(10) Patent No.: US 12,277,792 B2
(45) Date of Patent: Apr. 15, 2025

(54) LOCALIZED ANOMALY DETECTION IN DIGITAL DOCUMENTS USING MACHINE LEARNING TECHNIQUES

(71) Applicant: Dell Products L.P., Round Rock, TX (US)

(72) Inventors: Atul Kumar, Bangalore (IN); Anamika Chatterjee, Kolkata (IN); Saurabh Jha, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 282 days.

(21) Appl. No.: 17/977,506

(22) Filed: Oct. 31, 2022

(65) Prior Publication Data
US 2024/0144712 A1    May 2, 2024

(51) Int. Cl.
*G06V 30/418* (2022.01)
*G06T 9/00* (2006.01)
*G06V 30/19* (2022.01)
G06T 3/4046 (2024.01)
G06V 10/764 (2022.01)

(52) U.S. Cl.
CPC .............. *G06V 30/418* (2022.01); *G06T 9/00* (2013.01); *G06V 30/19093* (2022.01); *G06T 3/4046* (2013.01); *G06V 10/764* (2022.01)

(58) Field of Classification Search
USPC ......................................... 382/156, 159, 224
See application file for complete search history.

(56) References Cited

U.S. PATENT DOCUMENTS

| | | | |
|---|---|---|---|
| 11,526,990 B1* | 12/2022 | Tamir ................... | G06V 10/764 |
| 2017/0308734 A1* | 10/2017 | Chalom ............... | G06V 40/193 |
| 2023/0073357 A1* | 3/2023 | Tsunoda ................ | G06V 10/82 |
| 2023/0360430 A1* | 11/2023 | Qian .................... | G06V 10/776 |
| 2023/0386191 A1* | 11/2023 | Zhu ...................... | G06V 10/774 |

OTHER PUBLICATIONS

Van Beusekom, Joost, et al., "Distortion measurement for automatic document verification," 2011 International Conference on Document Analysis and Recognition (pp. 289-293), IEEE, Sep. 18, 2011.
Dosovitskiy, Alexey, et al. "An image is worth 16x16 words: Transformers for image recognition at scale." arXiv preprint arXiv:2010.11929, available at: https://arxiv.org/pdf/2010.11929.pdf (last accessed Oct. 31, 2022), Oct. 22, 2020.

* cited by examiner

*Primary Examiner* — Haris Sabah
(74) *Attorney, Agent, or Firm* — Ryan, Mason & Lewis, LLP (57) ABSTRACT

Methods, apparatus, and processor-readable storage media for localized anomaly detection in digital documents are provided herein. An example computer-implemented method includes identifying at least one image in a digital document; processing the identified at least one image using at least an image compression algorithm; applying a first machine learning model to the at least one processed image, wherein the first machine learning model is trained to detect whether the at least one image comprises one or more modifications; in response to detecting that the at least one image comprises at least one modification, applying a second machine learning model to identify a location in the at least one image corresponding to the at least one modification; and generating an indication that identifies the location of the at least one modification in the at least one image.

20 Claims, 9 Drawing Sheets

LOCALIZED ANOMALY DETECTION IN DIGITAL DOCUMENTS USING MACHINE LEARNING TECHNIQUES

FIELD

The field relates generally to information processing systems, and more particularly to detecting anomalies using such systems.

BACKGROUND

Digital documents are increasingly replacing physical documents across many industries. For example, many types of documents are increasingly in the form of a digital file (e.g., an image file). These files are often susceptible to being modified (either intentionally or accidentally), which can lead to various problems.

SUMMARY

Illustrative embodiments of the disclosure provide techniques for localized anomaly detection in digital documents. An exemplary computer-implemented method includes identifying at least one image in a digital document; processing the identified at least one image using at least an image compression algorithm; applying a first machine learning model to the at least one processed image, wherein the first machine learning model is trained to detect whether the at least one image comprises one or more modifications; in response to detecting that the at least one image comprises at least one modification, applying a second machine learning model to identify a location in the at least one image corresponding to the at least one modification; and generating an indication that identifies the location of the at least one modification in the at least one image.

Illustrative embodiments can provide significant advantages relative to conventional techniques for detecting anomalies (e.g., digital modifications and/or alterations) in documents. For example, technical problems associated with anomaly detection in digital documents are mitigated in one or more embodiments by implementing a classification and localization machine learning framework that is trained based on an image compression process.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Documents are often stored in a digital format, such as one or more image formats and/or a PDF (portable document format). These documents can be modified in a number of ways, such as by moving one or more portions of another image onto the digital document, adding editable text into the digital document using a copy-paste operation, and/or moving one or more portions of the digital document within the digital document itself, as non-limiting examples. The modified documents can cause different types of problems. For example, a product might be sent to an incorrect address, or a customer might receive a product or service that was not ordered.

Conventional approaches that attempt to detect modifications of digital documents often rely on algorithms that require structured data. Some of these algorithms rely on attention-based models. Generally, the complexity of such models increases quadratically with increases in the input sequence, thereby limiting their usefulness.

Some embodiments described herein provide a machine learning framework that can efficiently detect one or more anomalies in a given digital document, as well as respective locations of such anomalies.

Figure 1:
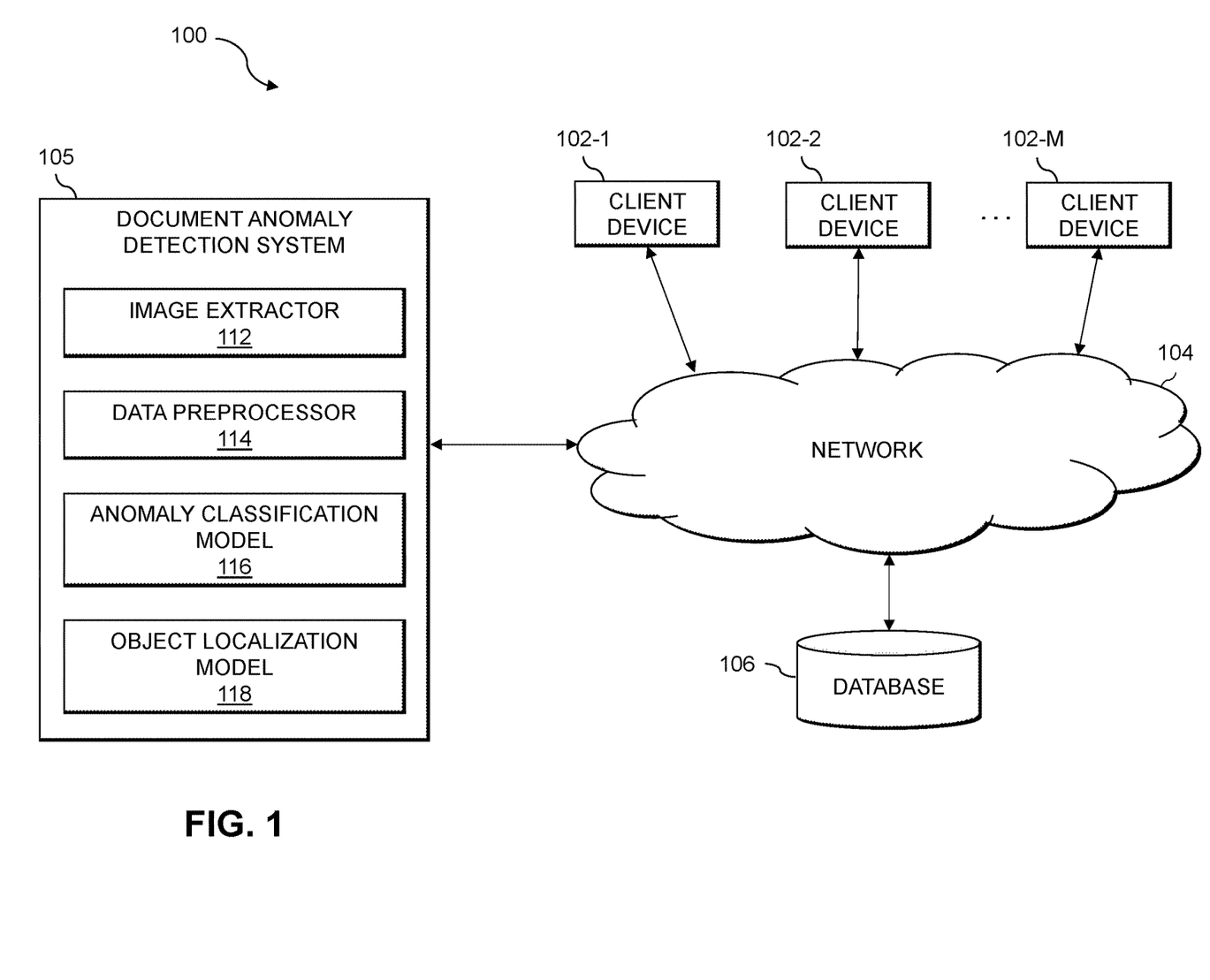
FIG. 1 shows an information processing system configured for localized anomaly detection in digital documents in an illustrative embodiment.

FIG. 1 shows a computer network (also referred to herein as an information processing system) 100 configured in accordance with an illustrative embodiment. The computer network 100 comprises a plurality of client devices 102-1, 102-2, . . . 102-M, collectively referred to herein as client devices 102. The client devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a document anomaly detection system 105.

The client devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The client devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the document anomaly detection system 105 can have at least one associated database 106 configured to store data pertaining to, for example, digital images and/or other documents.

An example database 106, such as depicted in the present embodiment, can be implemented using one or more storage systems associated with the document anomaly detection system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the document anomaly detection system 105 are one or more input-output devices, which illustratively comprise keyboards, displays or other types of input-output devices in any combination. Such input-output devices can be used, for example, to support one or more user interfaces to the document anomaly detection system 105, as well as to support communication between document anomaly detection system 105 and other related systems and devices not explicitly shown.

Additionally, the document anomaly detection system 105 in the FIG. 1 embodiment is assumed to be implemented using at least one processing device. Each such processing device generally comprises at least one processor and an associated memory, and implements one or more functional modules for controlling certain features of the document anomaly detection system 105.

More particularly, the document anomaly detection system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the document anomaly detection system 105 to communicate over the network 104 with the client devices 102, and illustratively comprises one or more conventional transceivers.

The document anomaly detection system 105 further comprises an image extractor 112, a data preprocessor 114, an anomaly classification model 116, and an object localization model 118.

Generally, the image extractor 112 obtains a digital file, which can be stored in any suitable format (e.g., a PDF, JPG, PNG, TIFF, etc.). If the digital document is a PDF document, the image extractor 112 searches for images in the file based on a set of specified file extensions. If any images are found, then the image extractor 112 extracts the images and provides them to the data preprocessor 114. If the digital document is already saved in an image format, then the image extractor 112 can provide the image directly to the data preprocessor 114.

The data preprocessor 114 processes the image that is provided by the image extractor 112 so that it can be ingested by the anomaly classification model 116. In some embodiments, processing the image can include applying an image compression algorithm that can detect different compression levels if an image has been manipulated and saved at a given quality level. The image compression algorithm can be used to determine, for example, high-level regions of the image that have been potentially modified, as explained in more detail elsewhere herein.

The anomaly classification model 116 is trained to determine whether a given object in an image has been modified. Non-limiting examples of a training process and an implementation of the anomaly classification model 116 are discussed in more detail in conjunction with FIGS. 2 and 3, for example.

Figure 4:
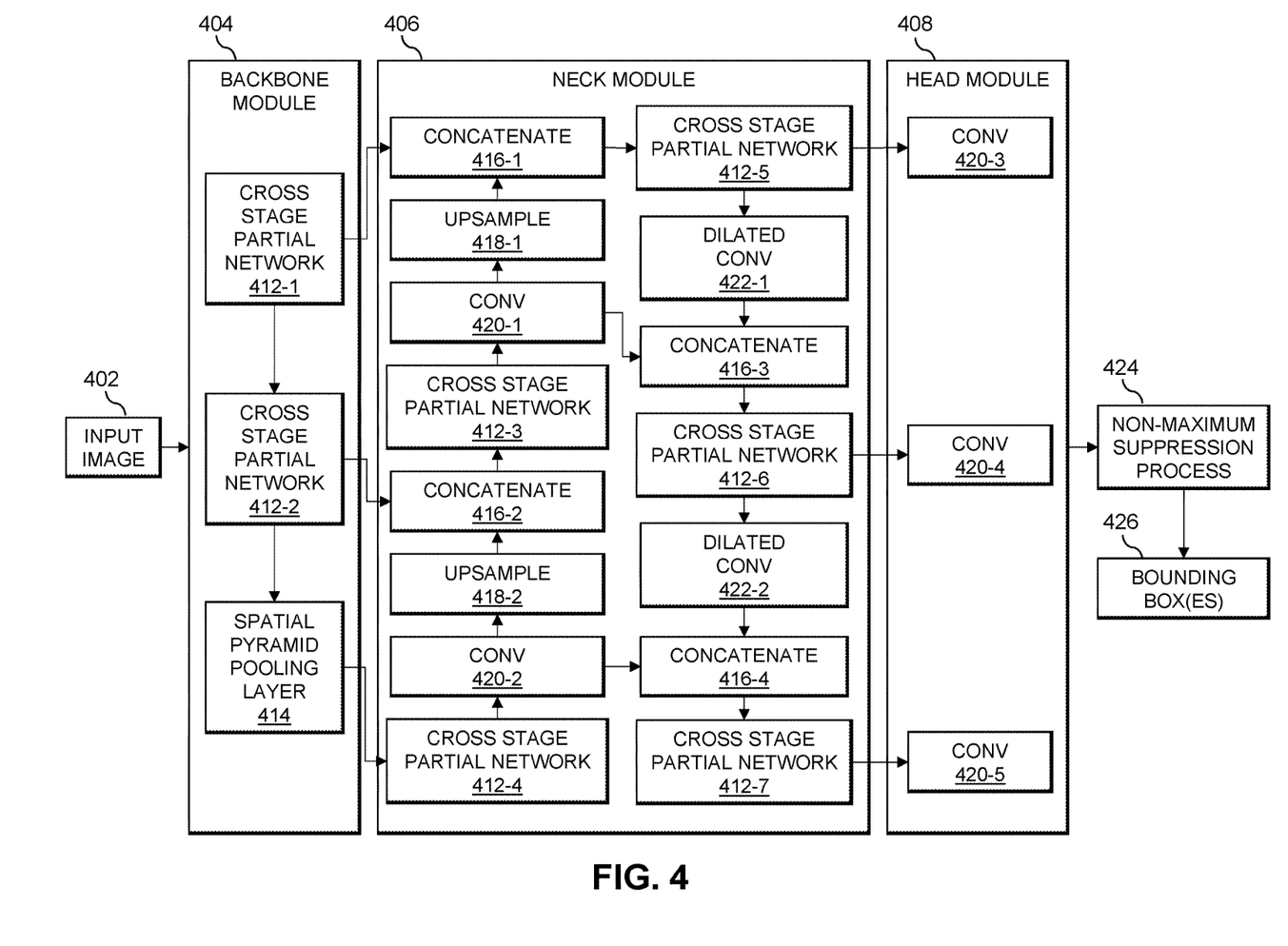
FIG. 4 shows an example of an object localization model in an illustrative embodiment.

If the output of the anomaly classification model 116 indicates that the image has been modified, then the object localization model 118 can determine the location (e.g., coordinates) of the modified object with respect to the image, as discussed in further detail in conjunction with FIG. 4, for example.

In some embodiments, the document anomaly detection system 105 can initiate one or more automated actions in response to determining that the image has been modified. Non-limiting examples of such actions include preventing the digital document from being processed, generating one or more alerts, outputting the digital document to a user with at least one indication of a portion of the document that has been potentially modified, and/or outputting one or more alerts. In at least one embodiment, a user can provide feedback to verify whether or not the digital document was modified. Such feedback can be used to train or update at least one of the anomaly classification model 116 and the object localization model 118, for example.

It is to be appreciated that this particular arrangement of elements 112, 114, 116, and 118 illustrated in the document anomaly detection system 105 of the FIG. 1 embodiment is presented by way of example only, and alternative arrangements can be used in other embodiments. For example, the functionality associated with the elements 112, 114, 116, and 118 in other embodiments can be combined into a single module, or separated across a larger number of modules. As another example, multiple distinct processors can be used to implement different ones of the elements 112, 114, 116, and 118 or portions thereof.

At least portions of elements 112, 114, 116, and 118 may be implemented at least in part in the form of software that is stored in memory and executed by a processor.

It is to be understood that the particular set of elements shown in FIG. 1 for document anomaly detection system 105 involving client devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the document anomaly detection system 105 and database(s) 106 can be on and/or part of the same processing platform.

An exemplary process utilizing elements 112, 114, 116, and 118 of an example document anomaly detection system 105 in computer network 100 will be described in more detail with reference to, for example, the flow diagram of FIG. 6.

Figure 2:
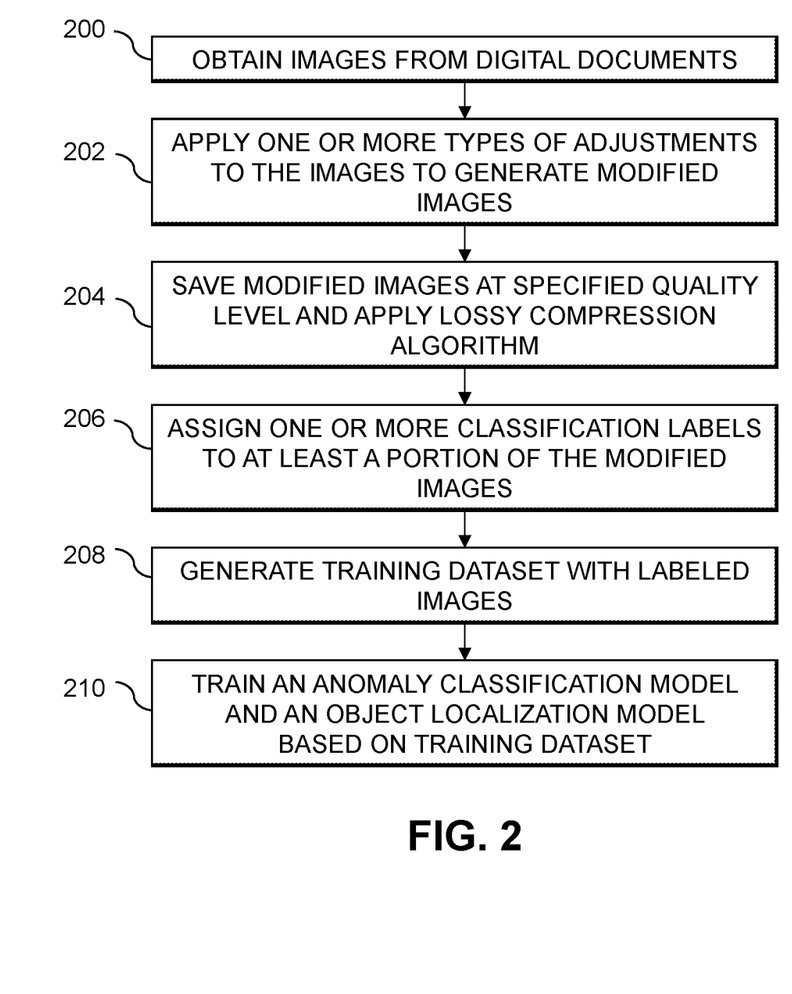
FIG. 2 shows a flow diagram for a machine learning training process in an illustrative embodiment.

FIG. 2 shows a flow diagram of a machine learning training process in an illustrative embodiment. Step 200 includes obtaining images from one or more original digital documents. The term original digital document in this context and elsewhere herein refers to a digital document or file that has not been modified.

Step 202 includes applying one or more types of adjustments to the images to generate modified images of the digital document that are to be used as training samples. As an example, one or more portions of a given one of the images obtained at step 200 can be modified by copying and pasting text and/or images directly onto the original image. Accordingly, multiple modified versions of the original image can be created. In some embodiments, the images obtained from the original digital document can be edited using different programs and/or the modified versions can be saved with different settings (e.g., formats, resolutions, and/or sizes) to further enhance the training data.

Step 204 includes saving the modified images at a specified quality level and applying a lossy compression algorithm to the modified images. For example, if an image has been modified and recompressed, then the modified portion of the image can be compressed differently from the rest of the image. This results from the fact that the source of the original image and the source of the modified portion are different. Using this concept, the lossy compression algorithm can be applied on the original versions of the images and the modified versions of the images to detect, for example, the high-level regions where the modifications have occurred. Analyzing the difference between the original image and its recompressed version accentuates the modified component. Accordingly, the lossy compression algorithm in step 204 can determine the difference in pixels between respective portions (e.g., eight-by-eight blocks) of the original and modified versions of the image, and these differences can be used to create a final image. If there are no modifications, then the final image would be consistent throughout (e.g., mostly dark). Modifications can be highlighted (e.g., white/rainbow effect) in the final image. Accordingly, the lossy compression algorithm does not depend on the image content and can be applied to different types of data, thereby easily identifying the modification regions.

Step 206 includes assigning one or more classification labels to at least a portion of the modified images. For example, the classification labels can indicate whether a given image is an original version or a modified version and/or indicate locations (e.g., using coordinates and/or a bounding box) associated with the modified portions. In at least some embodiments, the locations can be based on the results of step 204 and/or manually specified by a user.

Step 208 includes generating a training dataset with labeled images from step 206.

Step 210 includes training an anomaly classification model (such as the anomaly classification model 116) and an object localization model (such as the object localization model 118) based on the generated training dataset.

Figure 3:
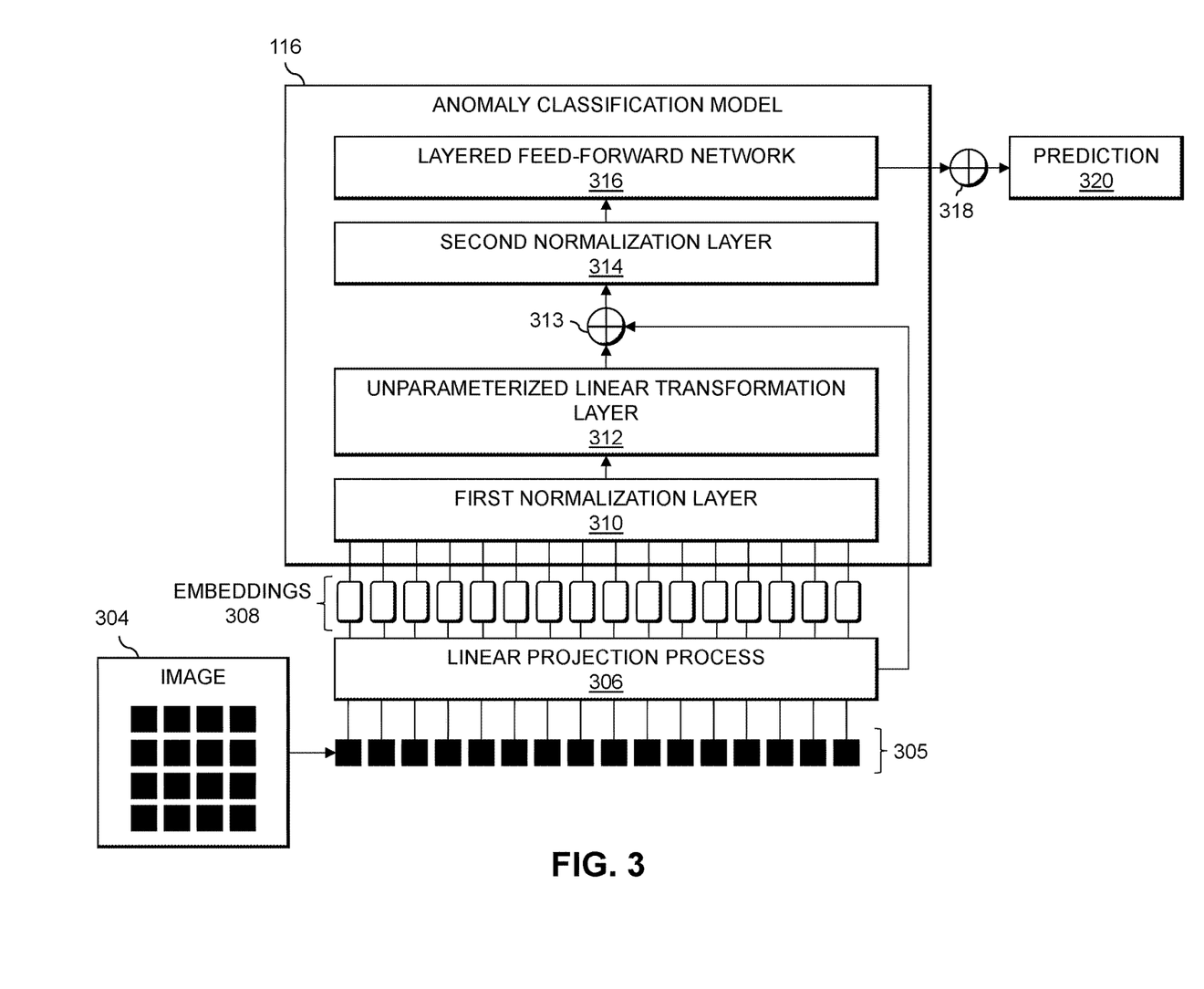
FIG. 3 shows an example of an anomaly classification model in an illustrative embodiment.

FIG. 3 shows an example of an anomaly classification model 116 in an illustrative embodiment. In the example shown in FIG. 3, an image 304 is divided into fixed-size patches (also referred to herein as portions). The patches of the image 304 are reshaped into a sequence 305. The sequence 305 is provided to a linear projection process 306, which linearly embeds each patch in the sequence 305, thereby resulting in a set of embeddings 308. The embeddings 308 are provided to the anomaly classification model 116. In this example, the anomaly classification model 116 comprises a first normalization layer 310, an unparameterized linear transformation layer 312, a second normalization layer 314, and a layered feed-forward network 316.

It is noted that conventional approaches using attention mechanisms require learnable position embeddings; however, the anomaly classification model 116 does not require such embeddings as the positions are captured by the unparameterized linear transformation layer 312. The unparameterized linear transformation layer 312, in at least some embodiments, does not require learnable parameters, thus improving the speed and efficiency (e.g., with respect to memory usage and/or model size) of the training process.

The unparameterized linear transformation layer 312, in some embodiments, can comprise alternating layers of multiheaded linear-transform and multi-layer perceptron blocks. In such embodiments, layers are normalized before every block (e.g., using the first normalization layer 310 and the second normalization layer 314) and residual connections 313 and 318 are made after every block. More specifically, the first normalization layer 310 and the second normalization layer 314, in at least some embodiments, can each calculate a set of statistics (e.g., mean and variance) for a given batch of inputs, and normalize each of the inputs based on these statistics.

It is further noted that in order to perform classification, an extra learnable token (referred to as a classification token) can be added to the sequence 305. Based on the outputs of the layered feed-forward network 316, the anomaly classification model 116 generates a prediction 320 of whether or not the image 304 has been modified. As an example, the layered feed-forward network 316 can be trained to generate the prediction 320 by processing the outputs of the second normalization layer 314 using an input layer, one or more hidden layers, and an output layer.

FIG. 4 shows an example of an object localization model in an illustrative embodiment. In the FIG. 4 example, the object localization model corresponds to a convolutional neural network (CNN), which includes a backbone module 404, a neck module 406, and a head module 408. In some embodiments, the modules 404, 406, and 408, collectively, can be implemented as the object localization model 118, for example.

Generally, the backbone module 404 extracts one or more features from an input image 402, the neck module 406 fuses multi-scale features from the backbone module 404 and transfers shallow positioning information to the head module 408, thereby enhancing the positioning ability on multiple scales. The head module 408 predicts an object bounding box 426 at the position corresponding to the input image 402 of a detected object. In at least some embodiments, the detected object can correspond to a portion of the image that has been modified.

The object localization model uses cross stage partial networks (CSPNet) 412-1 through 412-7, a spatial pyramid pooling layer 414, and two types of convolutional layers (denoted as "cony" in FIG. 4). Specifically, the convolutional layers include cony 420-1 through 420-5 (collectively referred to as cony 420), and dilated cony 422-1 and 422-2 (collectively referred to as dilated cony 422). As a non-limiting example, each cony 420 can be implemented as a 1×1 convolution, and each dilated cony 422 can be implemented as a 3×3 convolution having a dilation rate equal to 2. The object localization model also includes concatenation layers 416-1 through 416-4 and upsample layers 418-1 and 418-2. In some embodiments, each dilated cony 422 can use empty pixels to help increase the input scope of neurons in the neural network without losing resolution or increasing computation and/or memory costs. In other words, each dilated cony 422 can be implemented similarly as a convolution layer, where the empty pixels are skipped so as to cover a larger area of the input image 402.

In at least one embodiment, the object localization model applies a contiguous block dropout as a regularization mechanism. A contiguous block dropout drops contiguous regions from a feature map of a layer instead of dropping out independent random units. Dropping random units can be effective for fully connected layers; however, it is less effective for convolutional layers, where features are correlated spatially. When the features are correlated, even with dropout, information about the input can still be sent to the next layer, which can cause the networks to overfit.

The object localization model can also use anchor boxes to predict bounding boxes, after which a non-maximum suppression (NMS) process 424 can be applied to clean bounding boxes that do not include an object or include the same object as other bounding boxes. The NMS process 424 can remove all of the overlapping bounding boxes which have an intersection over union (IOU) value higher than a threshold value, for example.

Figure 5A:
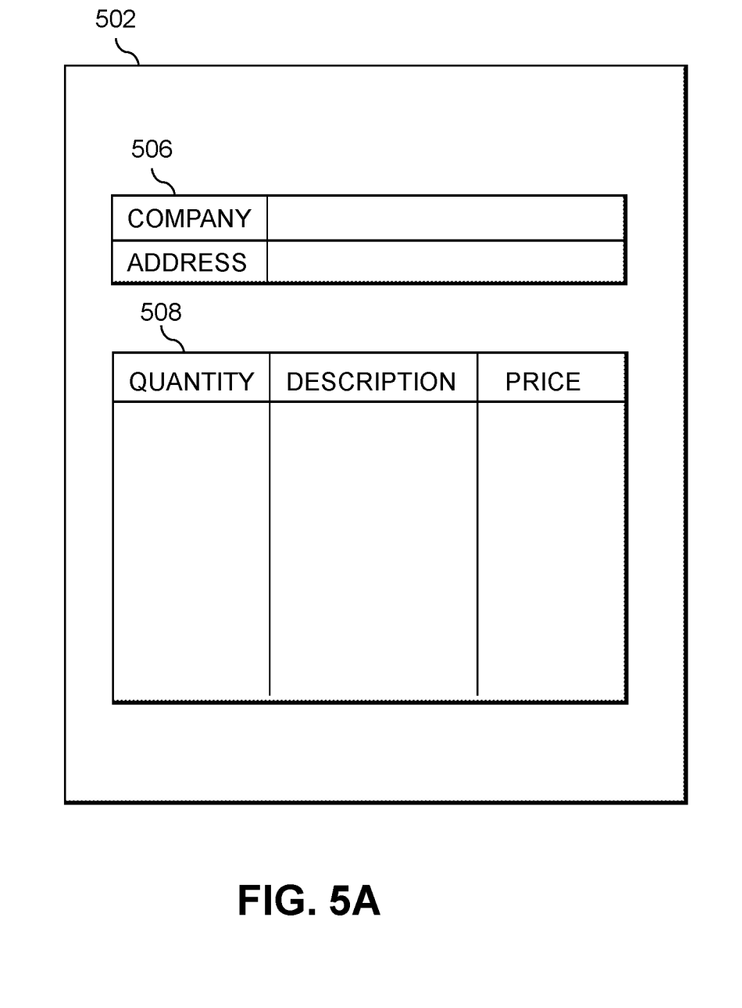
FIGS. 5A and 5B show examples of an original document and a modified document, respectively, in an illustrative embodiment.
Figure 5B:
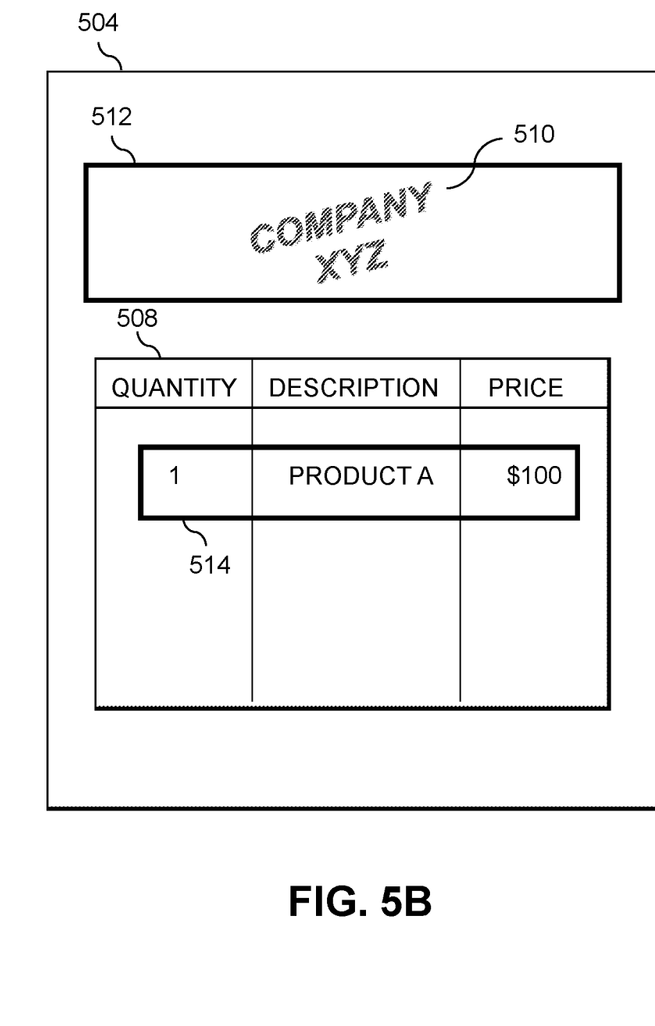

FIG. 5A shows an original document 502, and FIG. 5B shows a modified document 504 including detected modifications in an illustrative embodiment. In particular, the original document 502 includes a table 508 and section 506 for entering a company name and address. The modified document includes an image 510 that has been pasted over section 506 of the original document, and text has been added to the table 508. One or more embodiments described herein can detect that the original document 502 has been modified and, optionally, place bounding boxes 512 and 514 around the modified areas as shown in modified document 504.

Figure 5C:
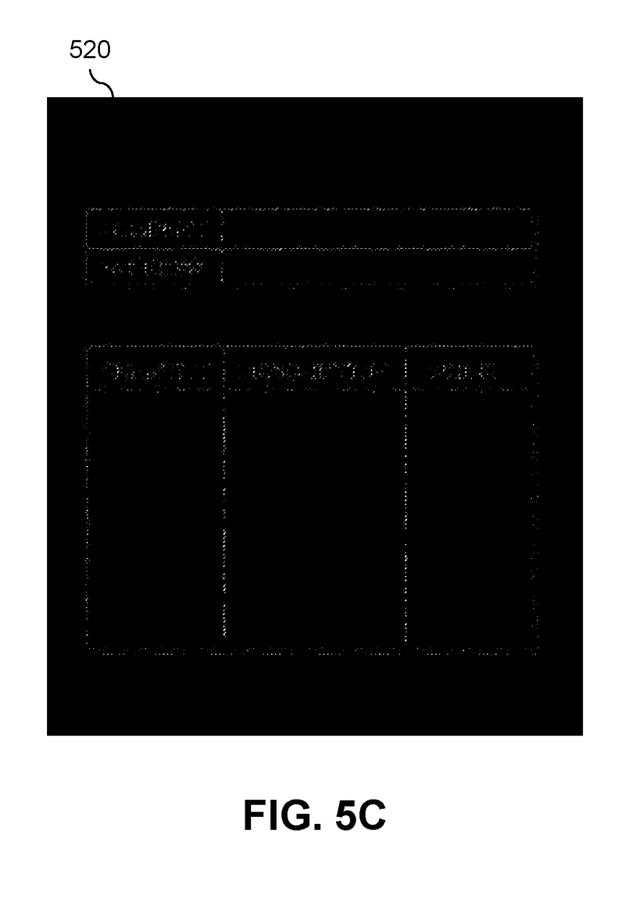
FIGS. 5C and 5D show examples of the original document and the modified document that have been processed with a compression algorithm in an illustrative embodiment.
Figure 5D:
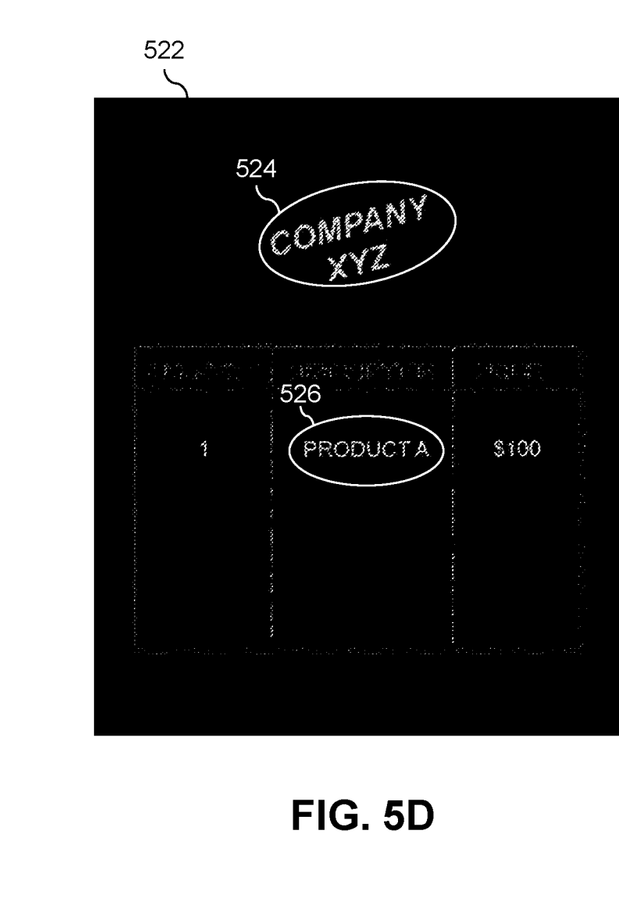

Referring also to FIGS. 5C and 5D, images 520 and 522 are generated as a result of applying a compression algorithm to the original document 502 and the modified document 504, respectively. The compression algorithm can correspond to a lossy compression algorithm applied by the data preprocessor 114, for example. The compressed image 520 has not been modified, and therefore is mostly dark throughout, for example, with very faint highlighting corresponding to the table 508 and the section 506 of the original document 502. The modifications corresponding to the image 510 and the text added to section 506 in the modified document 504 are more highlighted than the other regions of the compressed image 522. For example, "COMPANY XYZ" from image 510 is highlighted within region 524 of the compressed image 522, and the text "Product A" is highlighted within region 526 of the compressed image 522. The compressed images 520 and 522 can be used as training samples in a training dataset, such as the training dataset described in conjunction with FIG. 2, for example.

Figure 6:
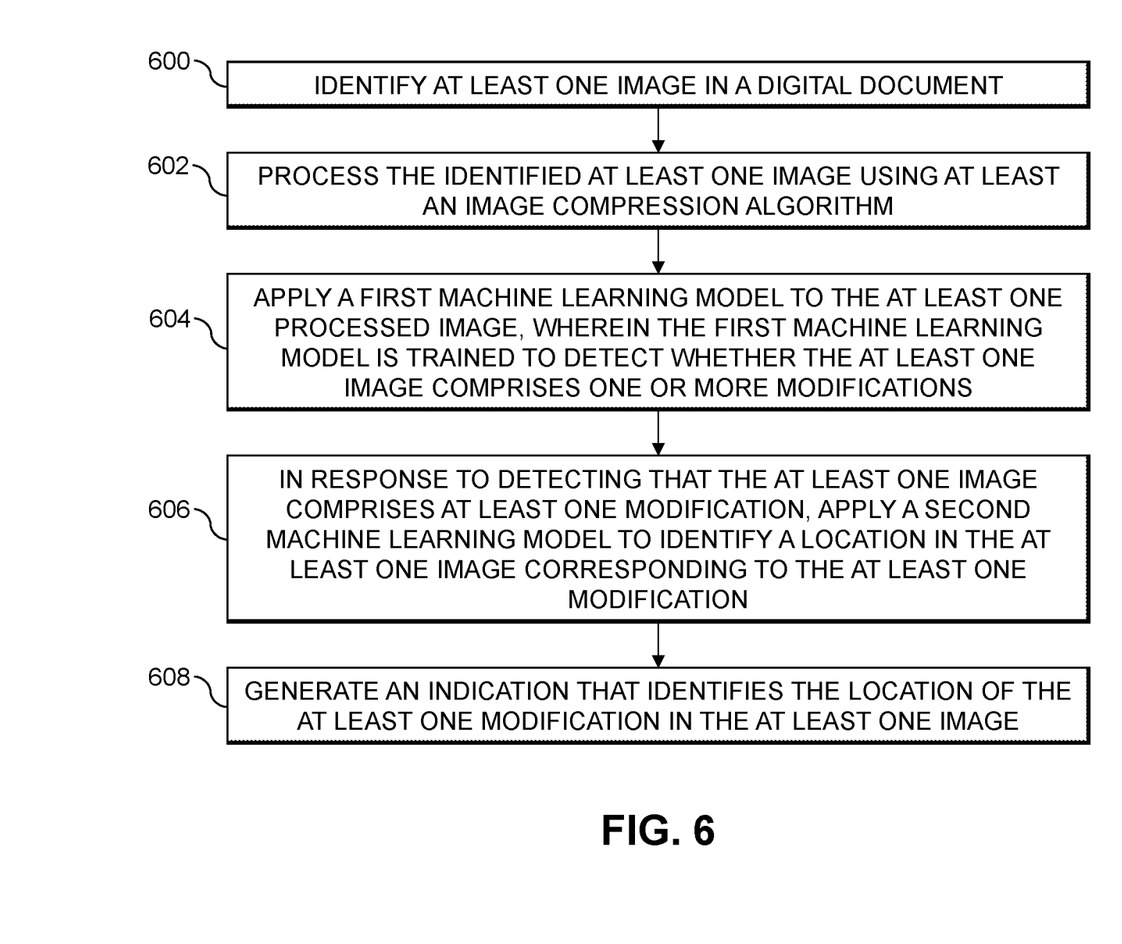
FIG. 6 shows a flow diagram for localized anomaly detection in digital documents in an illustrative embodiment.

FIG. 6 is a flow diagram of a process for localized anomaly detection in digital documents in an illustrative embodiment. It is to be understood that this particular process is only an example, and additional or alternative processes can be carried out in other embodiments.

In this embodiment, the process includes steps 600 through 608. These steps are assumed to be performed by the document anomaly detection system 105 utilizing its elements 112, 114, 116, and 118.

Step 600 includes identifying at least one image in a digital document.

Step 602 includes processing the identified at least one image using at least an image compression algorithm.

Step 604 includes applying a first machine learning model to the at least one processed image, wherein the first machine learning model is trained to detect whether the at least one image comprises one or more modifications.

Step 606 includes, in response to detecting that the at least one image comprises at least one modification, applying a second machine learning model to identify a location in the at least one image corresponding to the at least one modification.

Step 608 includes generating an indication that identifies the location of the at least one modification in the at least one image.

The first machine learning model may include an unparameterized linear transformation process. The image compression algorithm may include: generating a compressed version of the at least one image; and calculating a difference between pixels of the at least one image and pixels of the compressed version of the at least one image. The digital document may be saved in a portable document format, and the identifying may include extracting the at least one image from the digital document in an image format. The second machine learning model may include a convolutional neural network that uses empty pixel values to increase an input scope of neurons for the convolutional neural network. The second machine learning model may be trained using a contiguous block dropout process. The one or more modifications relate to one or more of: at least one additional image and text. The digital document may correspond to a request for one or more of a process and a service. The process may further include a step of preventing the request from being processed in response to detecting that the at least one image comprises the at least one modification.

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve the efficiency of machine learning processes for detecting anomalies in digital documents and/or identify the location of such anomalies even for digital documents that include unstructured data. These and other embodiments can effectively overcome problems associated with existing testing techniques that generally use machine learning models that require significant resources to train and/or require the digital document to be provided as structured data.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
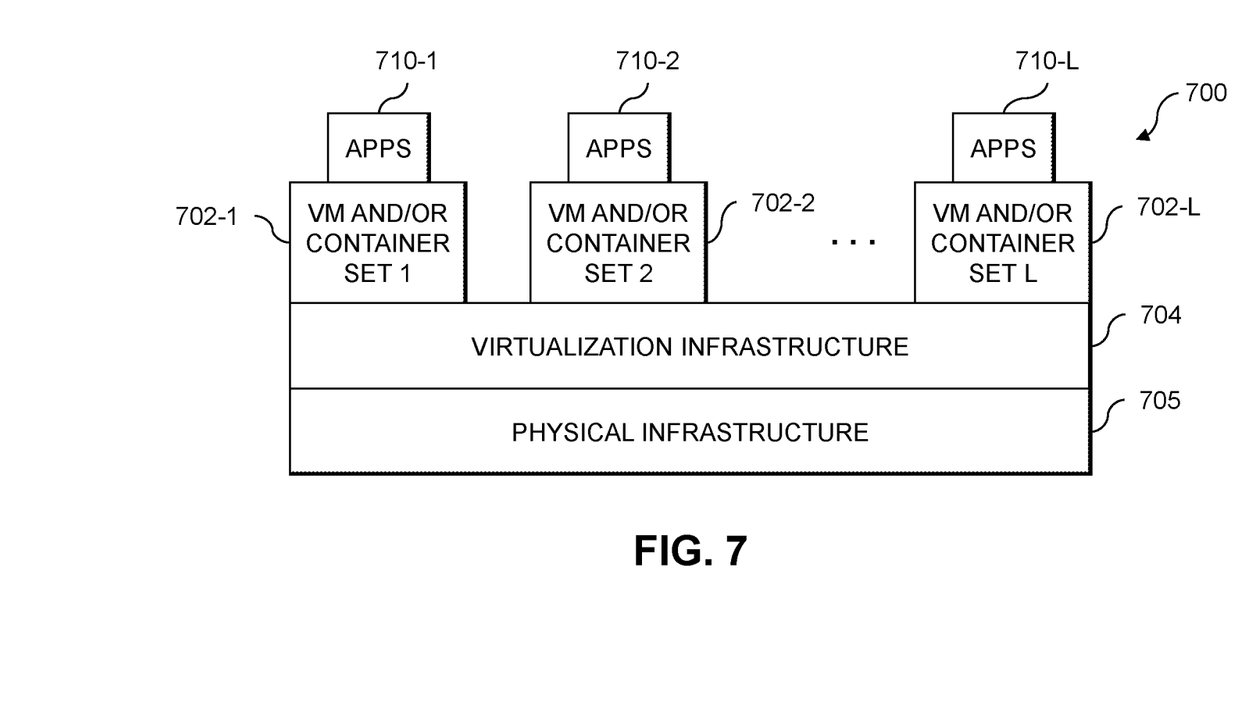
FIGS. 7 and 8 show examples of processing platforms that may be utilized to implement at least a portion of an information processing system in illustrative embodiments.
Figure 8:
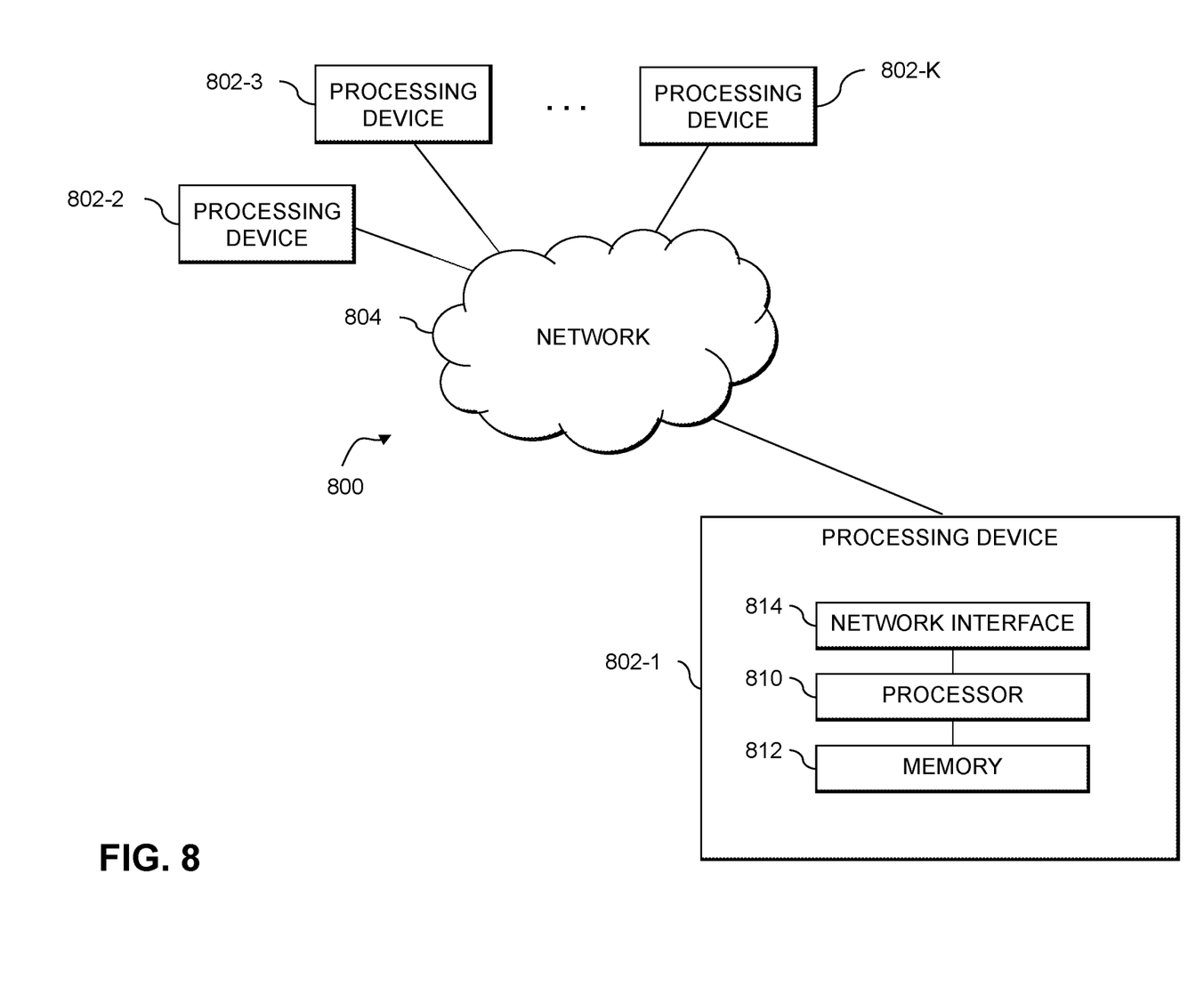

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, wherein the hypervisor platform has an associated virtual infrastructure management system. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a microcontroller, an ASIC, an FPGA or other type of processing circuitry, as well as portions or combinations of such circuitry elements.

The memory 812 comprises RAM, ROM or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
identifying at least one image in a digital document;
processing the identified at least one image using at least an image compression algorithm;
applying a first machine learning model to the processed at least one image, wherein the first machine learning model is trained to detect whether the processed at least one image comprises one or more modifications;
in response to detecting that the processed at least one image comprises at least one modification, applying a second machine learning model to identify a location in the processed at least one image corresponding to the at least one modification; and
generating an indication that identifies the location of the at least one modification in the processed at least one image;
wherein the method is performed by at least one processing device comprising a processor coupled to a memory.

2. The computer-implemented method of claim 1, wherein the first machine learning model comprises an unparameterized linear transformation process.

3. The computer-implemented method of claim 1, wherein the image compression algorithm comprises:
generating a compressed version of the processed at least one image; and
calculating a difference between pixels of the processed at least one image and pixels of the compressed version of the processed at least one image.

4. The computer-implemented method of claim 1, wherein the digital document is saved in a portable document format, and wherein the identifying comprises extracting the processed at least one image from the digital document in an image format.

5. The computer-implemented method of claim 1, wherein the second machine learning model comprises a convolutional neural network that uses empty pixel values to increase an input scope of neurons for the convolutional neural network.

6. The computer-implemented method of claim 1, wherein the second machine learning model is trained using a contiguous block dropout process.

7. The computer-implemented method of claim 1, wherein the one or more modifications relate to one or more of: at least one additional image and text.

8. The computer-implemented method of claim 1, wherein the digital document corresponds to a request for one or more of a process and a service.

9. The computer-implemented method of claim 8, further comprising:
preventing the request from being processed in response to detecting that the processed at least one image comprises the at least one modification.

10. A non-transitory processor-readable storage medium having stored therein program code of one or more software programs, wherein the program code when executed by at least one processing device causes the at least one processing device:
to identify at least one image in a digital document;
to process the identified at least one image using at least an image compression algorithm;
to apply a first machine learning model to the at least one image, wherein the first machine learning model is trained to detect whether the processed at least one image comprises one or more modifications;
in response to detecting that the processed at least one image comprises at least one modification, to apply a second machine learning model to identify a location in the processed at least one image corresponding to the at least one modification; and
to generate an indication that identifies the location of the at least one modification in the processed at least one image.

11. The non-transitory processor-readable storage medium of claim 10, wherein the first machine learning model comprises an unparameterized linear transformation process.

12. The non-transitory processor-readable storage medium of claim 10, wherein the image compression algorithm comprises:
generating a compressed version of the processed at least one image; and
calculating a difference between pixels of the processed at least one image and pixels of the compressed version of the processed at least one image.

13. The non-transitory processor-readable storage medium of claim 10, wherein the digital document is saved in a portable document format, and wherein the identifying comprises extracting the processed at least one image from the digital document in an image format.

14. The non-transitory processor-readable storage medium of claim 10, wherein the second machine learning model comprises a convolutional neural network that uses empty pixel values to increase an input scope of neurons for the convolutional neural network.

15. The non-transitory processor-readable storage medium of claim 10, wherein the second machine learning model is trained using a contiguous block dropout process.

16. An apparatus comprising:
at least one processing device comprising a processor coupled to a memory;
the at least one processing device being configured:
to identify at least one image in a digital document;
to process the identified at least one image using at least an image compression algorithm;
to apply a first machine learning model to the at least one image, wherein the first machine learning model is trained to detect whether the processed at least one image comprises one or more modifications;
in response to detecting that the processed at least one image comprises at least one modification, to apply a second machine learning model to identify a location in the processed at least one image corresponding to the at least one modification; and
to generate an indication that identifies the location of the at least one modification in the processed at least one image.

17. The apparatus of claim 16, wherein the first machine learning model comprises an unparameterized linear transformation process.

18. The apparatus of claim 16, wherein the image compression algorithm comprises:
generating a compressed version of the processed at least one image; and
calculating a difference between pixels of the processed at least one image and pixels of the compressed version of the processed at least one image.

19. The apparatus of claim 16, wherein the digital document is saved in a portable document format, and wherein the identifying comprises extracting the processed at least one image from the digital document in an image format.

20. The apparatus of claim 16, wherein the second machine learning model comprises a convolutional neural network that uses empty pixel values to increase an input scope of neurons for the convolutional neural network.

* * * * *